3,663,465
PREPARATION OF OPEN-CELL POLYURETHANE FOAMS IN THE PRESENCE OF 2-SUBSTITUTED 1,1,3,3-TETRAALKYL GUANIDINES AND AN ACID
Adolf W. Fogiel, Wilmington, Del., assignor to E. I. du Pont de Nemours and Company, Wilmington, Del.
No Drawing. Filed Jan. 29, 1970, Ser. No. 6,965
Int. Cl. C08g 22/44
U.S. Cl. 260—2.5 AC
16 Claims

ABSTRACT OF THE DISCLOSURE

Open-cell, non-shrinking, flexible polyurethane foam prepared from an aliphatic polyisocyanate, a polyester polyol, and water in the presence of a 2-substituted-1,1,3,3-tetraalkyl guanidine as catalyst and an acid, said acid having a pKa of about 1–10 and being practically insoluble in diethyl ether; the addition of all the components being conducted in such a manner that contact between said acid and said catalyst is avoided prior to the mixing of all the components.

BACKGROUND OF THE INVENTION

The manufacture of polyurethane foams by the reaction of an organic isocyanate with one or more active hydrogen containing compounds such as polyether polyols, polyester polyols or polyamines in the presence of a blowing agent is well known. Such foams have found extensive application in the manufacture of articles such as seat cushions, wearing apparel, linings and mattresses.

In recent years a large body of art relating to the preparation of polyurethane foams has devoloped. For the most part, this art relates to the use of aromatic diisocyanates, particularly tolylene diisocyanate for the preparation of such foams. While foams having excellent physical properties can be readily prepared from aromatic isocyanates, they are generally subject to discoloration upon exposure to heat and light. Discoloration is especially troublesome in applications where aesthetic qualities are important such as in wearing apparel, drapery linings and furniture. Although polyurethane foams made with aliphatic polyisocyanates are considerably more resistant to discoloration, they are more difficult to make because aliphatic isocyanates are less reactive with polyols and water than are aromatic polyisocyanates. With the advent of new catalyst systems, it is now possible to sufficiently increase the reaction rates of aliphatic polyisocyanates with polyols and water to make reasonably good foams therefrom.

However, polyester based polyurethane foams made from aliphatic isocyanates by the processes of the prior art tend to have closed-cell structures and as as result an undesirable shrinking phenomenon has often been observed during production of such foams. Also, polyester-based polyurethane foams prepared from aliphatic polyisocyanates have in the past exhibited high compression sets in the order of 70–90 percent and while these values can be reduced by curing at elevated temperatures for extended periods of time, such practices are uneconomical. It is important for many applications, such as, for example, seating cushions and drapery linings, that foams have non-shrinking, open-cell structures and that they have good compression set values. There is, therefore, a need for an efficient method to prepare such foams.

SUMMARY OF THE INVENTION

Now, in accordance with the present invention there is provided a process for preparing open-cell, non-shrinking foams having good compression set from an aliphatic isocyanate and a polyester polyol wherein the reaction is carried out in the presence of a catalyst which is a 2-substituted - 1,1,3,3 - tetraalkyl guanidine and an acid compound which is not readily soluble in diethyl ether and which has a pKa within the range of about 1–10.

The term "2-substituted - 1,1,3,3 - tetraalkyl guanidine" as used herein refers to compounds designated by Formula I, below:

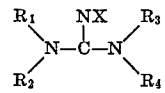

wherein $R_1$, $R_2$, $R_3$ and $R_4$ are independently $C_1$–$C_4$ alkyl, substituted $C_1$–$C_4$ alkyl wherein the substituents are $C_1$–$C_4$ alkoxy, or wherein the members within one or both of the pairs $R_1$–$R_2$ and $R_3$–$R_4$ are joined to form 5 to 7 membered rings, each consisting of carbon atoms and not more than two hetero atoms, including the guanidine nitrogen atom, from the group consisting of nitrogen, sulfur and oxygen, and X is phenyl or substituted phenyl wherein the substituents are $C_1$–$C_{12}$ alkyl or $C_1$–$C_4$ alkoxy or X is an alkyl radical of the formula

wherein $R_5$, $R_6$ and $R_7$ are independently hydrogen, $C_1$–$C_4$ alkyl or substituted $C_1$–$C_4$ alkyl wherein the substituents are phenyl, substituted phenyl wherein the substituents are as defined above, $C_1$–$C_4$ alkoxy, $C_6$–$C_{15}$ aryloxy, cyano or carboalkoxy, or $R_7$ can additionally be $C_5$–$C_{18}$ alkyl, phenyl, substituted phenyl wherein the substituents are as defined above, or $C_1$–$C_4$ alkoxy, or wherein the members within one or two of the pairs $R_5$–$R_6$, $R_5$–$R_7$ and $R_6$–$R_7$ are joined together to form a 5 to 7 membered ring consisting of carbon atoms and not more than one hetero atom from the group consisting of nitrogen, sulfur and oxygen.

DETAILED DESCRIPTION OF THE INVENTION

Foams can be prepared by the present process by conventional techniques for the preparation of water-blown polyurethane foams. One-shot, quasi-prepolymer and prepolymer procedures can be employed. These variations are well known and are described in "Polyurethanes: Chemistry and Technology," Saunders and Frisch, Chapter VII, Part II, Inter-Science Publishers (1964).

A preferred procedure for carrying out the process of the present invention is a two-step quasi-prepolymer procedure in which (1) an isocyanato-terminated prepolymer is prepared by reacting an aliphatic polyisocyanate with about 50–90 percent of the total amount of a polyester polyol to be used and (2) reacting the prepolymer thus formed with additional polyester polyol and water in the presence of a guanidine catalyst of this invention, a surfactant and an acid compound.

In order to make good foams with good compression set it is desirable to employ relative proportions of polyisocyanate, polyol and water so that the NCO index of these three components of the foam-forming mixture is about 60–130 and preferably about 70–100. The NCO index is 100×[total number of equivalents of NCO]/[total number of equivalents of active hydrogen]. In order to calculate the number of equivalents of NCO, the total weight of polyisocyanate to be used is divided by the equivalent weight of the polyisocyanate. The equivalent weight of the polyisocyanate is determined by dividing its molecular weight by the number of free NCO groups per molecule. The number of equivalents of active hydrogen is determined by dividing the total weight of the polyester polyol used by the equivalent weight of the polyol and adding the number of equivalents of water. For purposes of this calculation the equivalent weight of water is 9 and the equivalent weight of the polyol is determined by dividing its molecular weight by the number of free hydroxy groups per molecule.

The amount of water to be used will be largely dictated by the density of foam desired. Generally, about 2–5 parts by weight of water per 100 parts of polyol in the foam-forming mixture are preferred. This results in a foam having a density of about 2 lbs./cu. ft. Greater amounts of water yield foams of lower density and lesser amounts give foams of greater density as is well known in the art.

The amount of acid which can be used in the present process is from about 0.002 to about 0.1 gram mole per 100 grams of polyol. Above the upper limit, no additional improvement in the quality of foam produced by this process is observed. Below the lower limit, the effect of the acid is too small to have practical significance. The preferred amount is about 0.005–0.05 gram mole.

The substituted guanidine catalyst is employed in the amount of about 0.05–10 parts by weight per 100 parts of isocyanate plus polyol in the foam-forming mixture. The exact amount to be used depends on the reactivity of the isocyanate used, the scale of the foaming operation and the rate of reaction desired, but can be routinely determined by one skilled in the art.

In the practical operation of this invention, it is convenient to first mix the prepolymer, usually also containing unreacted polyisocyanate, with additional polyester polyol. The acid usually is mixed into this phase (hereinafter referred to as stream 1). Water and catalyst are then added to stream 1 either together or, if separately, the catalyst is added last. Alternatively, stream 1, water and the catalyst can be introduced into the reactor simultaneously as three separate streams. The preparation of the foam-forming mixture is conducted in such a manner that contact between the acid component and the catalyst component is avoided prior to the mixing of all the components.

The components can be mixed at room temperature, the reaction is exothermic, and the reaction temperature usually reaches the range of about 80–120° C. Normally no cooling is applied during the foaming step.

The catalysts used in this invention are pentasubstituted guanidines of the formula

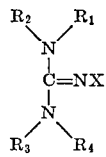

wherein $R_1$, $R_2$, $R_3$ and $R_4$ are independently $C_1$–$C_4$ alkyl, substituted $C_1$–$C_4$ alkyl wherein the substituents are $C_1$–$C_4$ alkoxy, or wherein the members within one or both of the pairs $R_1$–$R_2$ and $R_3$–$R_4$ are joined to form 5 to 7 membered rings, each consisting of carbon atoms and not more than two hetero atoms, including the guanidine nitrogen atom, from the group consisting of nitrogen, sulfur and oxygen and X is phenyl or substituted phenyl wherein the substituents are $C_1$–$C_{12}$ alkyl or $C_1$–$C_4$ alkoxy or X is an alkyl radical of the formula

wherein $R_5$, $R_6$ and $R_7$ are independently hydrogen, $C_1$–$C_4$ alkyl or substituted $C_1$–$C_4$ alkyl wherein the substituents are phenyl, substituted phenyl, wherein the substituents are as defined above, $C_1$–$C_4$ alkoxy, $C_6$–$C_{15}$ aryloxy, cyano or carboalkoxy, or $R_7$ can additionally be $C_5$–$C_{18}$ alkyl, phenyl, substituted phenyl wherein the substituents are as defined above or $C_1$–$C_4$ alkoxy, or wherein the members within one or two of the pairs $R_5$–$R_6$, $R_5$–$R_7$ and $R_6$–$R_7$ are joined together to form a 5 to 7 membered ring consisting of carbon atoms and not more than one hetero atom from the group consisting of nitrogen, sulfur and oxygen.

Representative substituted guanidines include 2-phenyl-1,1,3,3-tetramethylguanidine,
2-(4-dodecylphenyl)-1,1,3,3-tetramethylguanidine,
2-(4-methoxyphenyl)-1,1,3,3-tetrabutylguanidine,
1,1,2,3,3-pentamethylguanidine,
2-n-butyl-1,1,3,3-tetramethylguanidine,
2-cyclohexyl-1,1,3,3-tetramethylguanidine,
2-n-decyl-1,1,3,3-tetramethylguanidine,
2-n-dodecyl-1,1,3,3-tetramethylguanidine,
2-butyl-1,1,3,3-tetraethylguanidine,
2-tert-butyl-1,1,3,3-tetramethylguanidine,
2-(beta-cyanoethyl)-1,1,3,3-tetramethylguanidine,
2-(beta-carbobutoxyethyl)-1,1,3,3-tetramethylguanidine,
2-(beta-carbooctoxyethyl)-1,1,3,3-tetramethylguanidine,
2-(beta-phenethyl)-1,1,3,3-tetrapropylguanidine,
2-benzyl-1,1,3,3-tetrabutylguanidine,
2-(3-phenoxypropyl)-1,1,3,3-tetraethylguanidine,
2-beta-ethoxyethyl)-1,1,3,3-tetramethylguanidine,
2-butoxymethyl-1,1,3,3-tetramethylguanidine,
2-(tetrahydro-2-thienyl)-1,1,3,3-tetramethylguanidine,
2-(octahydro-4a-benzothiopyranyl)-1,1,3,3-tetramethylguanidine,
2-(octahydro-4a-benzopyranyl)-1,1,3,3-tetramethylguanidine,
2-(tetrahydrofurfuryl)-1,1,3,3-tetramethylguanidine,
2-(decahydro-4a-naphthyl)-1,1,3,3-tetramethylguanidine,
2-(3-piperidyl)-1,1,3,3-tetramethylguanidine,
2-(decahydro-4a-quinolyl)-1,1,3,3-tetramethylguanidine,
dipiperidino-N-methylmethylene imine,
dimorpholino-N-methylmethylene imine,
dithiomorpholino-N-methylmethylene imine,
dipiperazine-N-methylmethylene imine,
N-methyl-C-piperidino-C-dimethylamine methylene imine,
N-methyl-C-morpholino-C-dimethylamino methylene imine,
N-methyl-C-thiomorpholino-C-dimethylamino methylene imine, and
N-methyl-C-piperazino-C-dimethylamino methylene imine.

Of these compounds the 2-cyclohexyl-, 2-n-decyl- and 2-n-dodecyl-substituted 1,1,3,3 - tetramethylguanidines are preferred catalysts.

Polyester polyols which can be used in foam preparation according to the present process have equivalent weights of about 500 to 1500. Suitable polyester polyols can be prepared by reaction of a di- or poly carboxylic acid with a polyol, such as glycol, a triol or a tetrol; by the reaction of polycarboxylic acid anhydride with a polyol; by transesterification or by the reaction of a polycarboxylic acid chloride with a polyol, optionally in the presence of a proton acceptor, such as a tertiary amine. Representative polycarboxylic acids which are useful in the preparation of polyester polyols are succinic acid, glutaric acid, adipic acid, benzenedicarboxylic acids and phthalic acids. Suitable starting polyols include ethylene glycol, propylene glycol, 1,3-butanediol, 1,4-butanediol, diethylene glycol, 2,2-dimethyl-1,3-propane diol, 1,6-hexanediol, glycerol, pentaerythritol and sorbitol.

The term "aliphatic polyisocyanate" as used herein includes any organic polyisocyanate in which the isocyanato groups are attached to saturated carbon atoms. Cycloaliphatic polyisocyanates and polyisocyanates containing aromatic rings such as xylylene diisocyanate can be used provided they meet the limitation stated above. Representative aliphatic polyisocyanates include 1,4-tetramethylene diisocyanate, 1,6-hexamethylene diisocyanate, 2,2,4-trimethyl-1,6-hexamethylene diisocyanate, m- and p-xylylene diisocyanates, alpha,alpha,alpha,alpha-tetramethyl-p-xylylene diisocyanate, 3 - isocyanatomethyl-3,5,5-trimethylcyclohexyl isocyanate, phenylenebis-(2-ethyl isocyanate), 4-methyl - 1,3 - cyclohexylene diisocyanate, 2-methyl-1,3-cyclohexylene diisocyanate, 4,4' - methylenebis-(cyclohexyl isocyanate) and 2,4'-methylenebis-(cyclohexyl isocyanate). In addition, aliphatic diisocyanates which contain ester linkages can be used. Illustrative of such isocyanates are bis(2-isocyanatoethyl)carbonate, bis(2-isocyanatoethyl)fumarate, bis(2 - isocyanatoethyl)-4-cyclohexene-1,2-dicarboxylate and lower alkyl esters of 2,5 - diisocyanatovaleric acid. Polyisocyanates containing three or more isocyanato groups per molecule such as 2,4 - bis(4 - isocyanatocyclohexylmethyl)cyclohexyl isocyanate can also be used but preferably only in small quantities in combination with diisocyanates. The preferred isocyanate is 4,4'-methylenebis(cyclohexyl isocyanate) (PICM) because of the high quality foams it gives and its relatively low volatility. Isomeric mixtures of PICM which are liquid at room temperature are particularly preferred because of their handling convenience in foam formulations. Such liquid PICM mixtures contain less than 25% trans-trans isomer and less than 75% cis-cis isomer. They are prepared by phosgenating the corresponding 4,4' - methylenebis(cyclohexyl amine) (PACM) isomeric mixtures by procedures well known in the art, cf. U.S. Pats. 2,644,007, 2,680,127 and 2,908,703. The PACM isomer mixtures which upon phosgenation yield liquid PICM are also well known in the art, and can be obtained by hydrogenation of methylenedianiline under mild conditions and/or by fractional crystallization of PACM isomer mixtures in the presence of water and alcohols. In general, polyisocyanates which are liquid at room temperature are preferred since the process of this invention is most conveniently operated when all the materials are at or slightly above room temperature. If the isocyanate used is a solid at room temperature, the reaction must be carried out at a hgher temperature at which the isocyanate is liquid.

In the preparation of polyurethane foams in accordance with the present invention it is necessary to control the interaction of the catalyst and acid. The acid must not be allowed to neutralize a significant proportion of the catalyst prior to foam formation. Generally, the tetraalkylguanidine catalyst is more soluble in the organic phase or phases than in the water phase. The acid is, therefore, selected so as to be practically insoluble in the organic phase or phases. Acids readily soluble in diethyl ether are not suitable for this inivention. For the purposes of this specification, the term "readily soluble" means that more than about one gram of the acid is soluble in 100 ml. of diethyl ether at room temperature. In addition to being insoluble in ether, the acids must be Broenstedt acids whose pKa is within the range of about 1–10. pKa is defined as $-\log_{10}$Ka, where Ka is the dissociation constant of the acid. A Brodenstedt acid can be a salt of a polybasic acid, which still has replaceable hydrogen atoms, for instance, sodium bisulfate or sodium dihydrogen phosphate. In such a case, the pKa of the $HSO_4^-$ or $H_2PO_4^-$ ion must be about 1.10.

There are no structural limitations on the acids. Examples of acids which can be used include sodium bisulfate, boric acid, methyliminodiacetic acid, aminobenzenesulfonic acid, sodium dihydrogen phosphate, ethylenediaminetetraacetic acid, nitrilotriacetic acid, silicic acid and sulfamic acid. Preferably, the acids are added to the polymer or polyol prior to addition of the catalyst in a finely divided form.

When boric acid is employed there results an open-cell, non-shrinking, flexible polyurethane foam which exhibits temperature reversible flaccid behavior. That is, at elevated temperatures, above about 90° C., the foam offers substantially no resistance to deformation and restores itself to its original shape relatively slowly. When cooled to temperatures below about 50° C. the original resilient behavior of the foam is regained.

Preferred acids are those which are not only insoluble in diethyl ether but are also only slightly soluble in water. Such preferred acids include ethylenediaminetetraacetic acid and nitrilotriacetic acid.

In order to obtain a foam of good physical properties and a uniform cell structure, it is desirable to have in the reaction medium a surface active agent. Any surface active agent useful in making polyurethane foams can be employed. Polydimethylsiloxanepolyalkyleneether block copolymers which are regularly employed in the preparation of polyurethane foams are suitable in most instances when used at levels of about 0.1–3.0 parts per 100 parts of polyol. Either hydrolytically stable block copolymers, of which

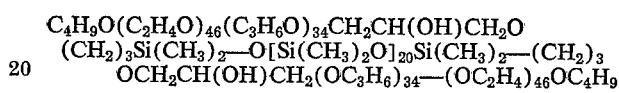

(disclosed in Canadian Patent 669,881) is illustrative, or block copolymers subject to slow hydrolysis such as

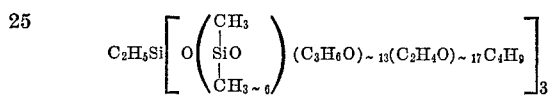

(disclosed in U.S. Patent 2,834,748) are satisfactory. Other nonionic surfactants which may be useful on occasion include materials such as polyoxypropylene-polyoxyethylene block copolymer, polyethoxylated vegetable oils and polyethoxylated monoesters of sorbitol and fatty acids. Anionic surfactants of which sulfonated castor oil and sodium dioctyl sulfoscuccinate are illustrative, are also useful.

Optionally, about 1–5 parts per 100 parts of polyester polyol in the foam-forming mixture of a low molecular weight polyol containing 3–6, preferably 3–4, hydroxyl groups and having a molecular weight of less than about 400 are incorporated into the foam-forming mixture. Representative of such polyols are trimethylolpropane, glycerol, 1,2,6-hexanetriol, pentaerythritol and sorbitol. Nitrogen containing polyols such as triethanol amine and N,N,N,N',N'-tetrakis(2-hydroxy propyl) ethylene diamine, the latter being especially preferred, may also be used. The addition of such polyols results in foams having increased load deflection, particularly at deflections below about 25%. Foams prepared by the process of this invention wherein boric acid is employed exhibit temperature reversible flaccid behavior unless the above described low molecular weight polyols are incorporated into the foam-forming mixture.

The term "flexible" as used herein with reference to foams indicates that the foam can be highly compressed; for instance, 90%, and upon removal of the compressive force, will rapidly (<5 seconds) return substantially to its original dimensions.

The term "open-cell" as used herein with reference to foams indicates that substantially all cells are interconnected through ruptured cell walls so that gas may escape or reenter when the foam is alternately compressed and released. Differences in the extent of cell wall rupturing lead to differing degrees of openness. An indication of the degree of cell opening can be obtained by rapidly squeezing and releasing a foam sample by hand. If a foam is highly open, it will respond almost instantly to the application or removal of pressure. If it is only slightly open, it will respond more slowly as time is required for the passage of gas from one cell to another.

The phase "non-shrinking" as used herein indicates that a foam maintains substantially the maximum volume reached during its formation even after cooling to room temperature. Shrinking is often associated with closed cell structure.

The phase "good compression set" as used herein refers to compression set values which are significantly lower than prior art values of 70–90%.

The term "load deflection" is described in ASTM D 1564–64T, load deflection test Method A.

The following examples illustrate the invention. All parts, percentages and proportions are by weight unless otherwise indicated.

Example 1

A mixture of 75.0 parts of a polyester polyol having an equivalent weight of about 1000 and a functionality of about 2.7 (obtained by esterification of adipic acid with a mixture of diethylene glycol and trimethylolpropane) and 53.4 parts of a liquid mixture of stereoisomers of 4,4'-methylenebis(cyclohexylisocyanate) containing about 20% trans-trans isomer, 65% cis-trans isomer and 15% cis-cis isomer is prepared at room temperature in an agitated reactor. The mixture is heated to 100° C. and maintained at that temperature for one hour. It is then cooled to room temperature and stored in dry containers until required. The prepolymer has a free —NCO content of about 10.8%.

A flexible foam is prepared from this prepolymer by a batch quasi-prepolymer procedure using the following formulation which has an NCO Index of 92.

| | Parts |
|---|---|
| Preploymer of this example | 128.4 |
| 4,4' - methylenebis(cyclohexyl isocyanate) isomer mixture described in this example | 15.0 |
| Polyester polyol of this example | 25.0 |
| Tetramethylene sulfone containing 2.9% water | 16.4 |
| Ethylenediaminetetraacetic acid | 2.9 |
| Surfactant A—a polysiloxane - polyoxyalkylene block copolymer sold as "DC–190" by Dow Corning Corp.; viscosity at 25° C., 1000–1500 centistokes; specific gravity at 25° C., 1035; refractive index at 25° C., 1.4480. Described in Bulletin: 05–1923; October 1967, Dow Corning Corporation | 0.5 |
| Surfactant B—a polysiloxane - polyoxyalkylene block copolymer sold as "DC–195" by Dow Corning Corp.; viscosity at 25° C., 325 centistokes; specific gravity at 25° C., 1.07; refractive index, 1.4540. Described in Bulletin: 05–160; September 1966, Dow Corning Corporation | 0.5 |
| Catalyst solution—water, 3.6 parts; 2-n-dodecyl-1,1,3,3-tetramethylguanidine, 1.3 parts; tetramethylene sulfone cont. 2.9% water, 2.5 parts | 7.4 |

Foam is prepared by agitating the mixture resulting from the addition of the ingredients in the order shown in the above formulation for about 20 seconds with a laboratory high-speed mixer (approx. 3000 r.p.m.) and pouring the resulting mass into an open container where it is allowed to foam. The rise time for the foam is about 115 seconds. No shrinkage is observed either immediately after the foam reaches full height or during extended storage. The foam has a highly open, breathable structure with cell sizes in the range of 32–64 cells/linear inch.

After aging at room temperature for at least seven days the foam is found to have a density of 2.2 lb./cu. ft. and a compression set (50% comp./70° C./22 hrs.) of 25%. Properties in this example and those hereinafter are measured in accordance with the procedures of ASTM D–1564 for flexible foams. In hand test, the tensile strength of the foam compares favorably to that of a typical commercial foam of similar density prepared from tolylene diisocyanate and a polyester polyol having an equivalent weight of about 1000.

When the procedure of this example is repeated with the 2.9 parts of ethylenediaminetetraacetic acid omitted, a second foam is obtained which has a compression set of about 70%. The structure of the foam is less open than that of the first foam. During its preparation, the second foam exhibits a trace of shrinkage and a rise time of about 110 seconds.

When foams are prepared from the formulation of this example using some but less than 2.9 parts of ethylenediaminetetraacetic acid, results intermediate to those described for the first and second foams of this example are obtained. When the amount of ethylenediamine tetraacetic acid is increased above 2.9 parts no significant additional improvement in foam properties is observed.

Example 2

A foam is prepared by a batch quasi-prepolymer procedure using the following formulation which has an NCO Index of 83.

| | Parts |
|---|---|
| Prepolymer of Example 1 | 128.4 |
| 4,4' - methylenebis(cyclohexyl isocyanate) isomer mixture described in Example 1 | 15.0 |
| Polyester polyol described in Example 1 | 25.0 |
| Tetramethylene sulfone containing 2.9% water | 16.4 |
| N,N,N',N' - tetrakis(2 - hydroxypropyl)-ethylenediamine | 1.84 |
| Ethylenediaminetetraacetic acid | 2.9 |
| Boric acid | 0.5 |
| Surfactant A—see Example 1 | 0.5 |
| Surfactant B—see Example 1 | 0.5 |
| Catalyst solution described in Example 1 | 7.4 |

Following the procedure of Example 1 the ingredients are mixed for about 35 seconds and allowed to foam. The rise time for the foam is about 190 seconds. No shrinkage of the foam is observed. The foam has a highly open structure with 32–64 cells/linear inch. After aging for at least seven days, the density is 2.6 lb./cu. ft., compression set is 16% and the tensile strength by hand tests similar to the first foam of Example 1.

Example 3

A series of five foams (3A–3E), differing mainly in the acid additivies used is prepared from the formulations tabulated below.

| | 3A | 3B | 3C | 3D | 3E |
|---|---|---|---|---|---|
| Prepolymer of Example 1, parts | 128.5 | 128.5 | 128.5 | 128.5 | 128.5 |
| 4,4'-methylenebis(cyclohexyl isocyanate), isomer mixture of Example 1, parts | 15.0 | 15.3 | 15.0 | 20.3 | 15.0 |
| Polyester polyol of Example 1, parts | 25.0 | 25.0 | 25.0 | 25.0 | 25.0 |
| Tetramethylene sulfone containing 2.9% water, parts | 16.4 | 12.5 | 16.4 | 16.4 | 12.5 |
| Nitrilotriacetic acid, parts | 2.55 | | | | |
| N-methylimino-diacetic acid, parts | | 2.94 | | | |
| Sulfamic acid, parts | | | 1.94 | | |
| Silicic acid (Hi-Sil 233), parts | | | | 6.4 | |
| Sodium bisulfate, monohydrate, parts | | | | | 1.4 |
| Surfactant A, Example 1, parts | | 0.5 | | | 0.5 |
| Surfactant B, Example 1, parts | | 0.5 | | | 0.5 |
| Surfactant C[1] | 1.0 | | 1.0 | 1.0 | |
| Catalyst solution: | | | | | |
| Tetramethylene sulfone containing 2.9% water, parts | 2.5 | 2.5 | 2.5 | 2.5 | 2.5 |
| Water, parts | 3.6 | 5.0 | 3.6 | 3.6 | 4.7 |
| 2-n-dodecyl-1,1,3,3-tetramethylguanidine, parts | 1.3 | 1.3 | 1.3 | 1.3 | 1.3 |

[1] A silicone surfactant for flexible polyester foams sold by Union Carbide as "L–532." Described in Product Information Bulletin 50–6, "L–532, Silicone Surfactant for Polyester Urethane Foam Formation," February 1966, Union Carbide.

Foams are prepared from the above formulations substantially by the procedure described in Example 1. The foams thus prepared are non-shrinking. NCO Index, mixing times and rise times as well as properties of the resulting foams are tabulated below.

| | 3A | 3B | 3C | 3D | 3E |
|---|---|---|---|---|---|
| NCO index | 92 | 70 | 88 | 92 | 70 |
| Mix time, seconds | 25 | 30 | 30 | 30 | 30 |
| Rise time, seconds | 100 | 115 | 130 | 120 | 150 |
| Cell structure | | | Open | | |
| Cells/linear inch | 32 | 32 | 32 | 32 | 16–32 |
| Compression set, percent | 59 | 49 | 56 | 37 | 45 |
| Density, lb./cu. ft. | 2.5 | 2.4 | 2.3 | 1.9 | 2.1 |

In hand tests, the tensile strength of all the foams matches that of a typical commercial foam as described in Example 1.

Example 4

A mixture of 75.0 parts of a polyester polyol having an equivalent weight of about 1000 and a functionality of about 2.3 (obtained by esterification of adipic acid with a mixture of diethylene glycol and trimethylolpropene) and 53.4 parts of the mixture of stereoisomers of 4,4'-methylenebis(cyclohexyl isocyanate) described in Example 1 is prepared at room temperature in an agitated reactor. The mixture is heated to 100° C., maintained at 100° C. for an hour, cooled to room temperature and stored in dry containers. It has an —NCO content of about 10.8%.

A flexible foam is prepared from this prepolymer using the following formulation.

| | Parts |
|---|---|
| Prepolymer of this example | 128.4 |
| 4,4'-methylenebis(cyclohexyl isocyanate) isomer mixture described in Example 1 | 8.2 |
| Polyester polyol of this example | 25.0 |
| Ethylenediaminetetraacetic acid | 2.9 |
| Surfactant A—see Example 1 | 0.5 |
| Surfactant B—see Example 1 | 0.5 |
| Water | 4.78 |
| 2-n-dodecyl-1,1,3,3-tetramethylguanidine | 1.3 |

This formulation has an NCO Index of 70. Foam is prepared by agitating the mixture resulting from the addition of the ingredients in the order shown for about 30 seconds and allowing the mixture to foam. Foam rise time is about 100 seconds. The resulting foam is non-shrinking and has an open-cell structure with cells ranging from 0.03 to 0.125 inch in diameter. The foam has a density of 2.3 lb./cu. ft. and its compression set is 33%.

When the procedure of this example is repeated with the exception that the 8.3 parts of the 4,4'-methylenebis(cyclohexyl isocyanate) isomer mixture is replaced by 1.8 parts of 4,4'-methylenebis(cyclohexyl isocyanate) plus 6.5 parts of 2,4-bis(p-isocyanatocyclohexylmethylene) cyclohexyl isocyanate, a second non-shrinking, open-cell foam having a density of 2.9 lb./cu. ft. and a compression set of 25% is obtained.

Example 5

A flexible foam is prepared substantially by the procedure described in Example 1 using the following formulation.

| | Parts |
|---|---|
| Prepolymer described in Example 1 | 128.4 |
| 4,4'-methylenebis(cyclohexyl isocyanate) isomer mixture of Example 1 | 15.0 |
| Polyester polyol described in Example 1 | 25.0 |
| Tetramethylene sulfone containing 2.9% water | 16.4 |
| Ethylenediaminetetraacetic acid | 2.9 |
| Boric acid | 0.5 |
| Surfactant A—see Example 1 | 0.5 |
| Surfactant B—see Example 1 | 0.5 |
| Catalyst solution—water, 3.6 parts; tetramethylenesulfone containing 2.9% water, 2.5 parts; 2-cyclohexyl-1,1,3,3-tetramethylguanidine, 1.0 part | 7.1 |

This formulation has an NCO Index of 87. The resulting foam is non-shrinking, has an open cell structure, a density of 2.3 lb./cu. ft. and a compression set of 48%. At temperatures of about 90° C. and higher, this foam exhibits flaccid behavior. This behavior is temperature reversible and samples of foam distorted at 90° C. or above regain their shape slowly. At temperatures below 50° C., the foams regain their original resilient behavior. This behavior is characteristic of foams of this invention containing boric acid unless a low molecular weight polyol such as N,N,N',N'-tetrakis(2-hydroxypropyl)ethylene diamine is used in conjunction with the boric acid as in Example 2.

I claim:

1. In a process for preparing an open-cell, non-shrinking, flexible polyurethane foam from a foam forming mixture of an aliphatic polyisocyanate, a polyester polyol, water and a 2 - substituted - 1,1,3,3-tetraalkyl guanidine catalyst; the improvement which consists essentially of incorporating into the foam forming mixture about 0.002–0.1 gram mole per 100 grams of polyester polyol of a Broenstedt acid having a pKa of about 1–10, said acid being soluble in diethyl ether to the extent of less than about 1 gram per 100 ml.; the addition of all the components of the foam forming mixture being conducted in such a manner that contact between said acid and said catalyst is avoided prior to the mixing of all the components.

2. The process of claim 1 wherein the amount of acid is about 0.005–0.05 gram mole per 100 grams of polyester polyol.

3. The process of claim 1 wherein (a) an isocyanato-terminated prepolymer is prepared by reacting the aliphatic polyisocyanate with about 50–90% of the total amount of polyester polyol to be employed and (b) then allowing this prepolymer to react with additional polyester polyol and water in the presence of the catalyst, the acid and a surfactant.

4. The process of claim 1 wherein the relative proportions of polyisocyanate, polyester polyol and water employed are chosen so that the NCO index of the foam forming composition is about 60–130.

5. The process of claim 1 wherein the NCO index of the foam forming composition is about 70–100.

6. The process of claim 1 in which the diisocyanate is methylenebis-4,4'-(cyclohexyl isocyanate).

7. The process of claim 1 in which the catalyst is 2-dodecyl-1,1,3,3-tetramethylguanidine.

8. The process of claim 1 in which the catalyst is 2-cyclohexyl-1,1,3,3-tetramethylguanidine.

9. The process of claim 1 in which the catalyst is 2-n-decyl-1,1,3,3-tetramethylguanidine.

10. The process of claim 1 in which the acid is ethylenediaminetetraacetic acid.

11. The process of claim 1 in which the acid is nitrilotriacetic acid.

12. The process of claim 1 in which the acid is silicic acid.

13. The process of claim 1 in which the acid is sulfamic acid.

14. The process of claim 1 in which the acid is boric acid.

15. The process of claim 1 wherein about 1–5 parts per 100 parts of polyester polyol present in the foam-forming mixture of a polyol containing 3–6 hydroxyl groups and having a molecular weight of less than about 400 are incorporated into the foam-forming mixture.

16. The process of claim 1 wherein about 1–5 parts per 100 parts of polyester polyol present in the foam-forming mixture of N,N,N',N'-tetrakis-(2-hydroxypropyl) ethylenediamine is incorporated into the foam-forming mixture.

References Cited

UNITED STATES PATENTS

| | | | |
|---|---|---|---|
| 3,523,106 | 8/1970 | Davison | 260—18 |
| 3,215,645 | 11/1965 | Flynn | 260—2.5 |
| 3,078,240 | 2/1963 | Hoshino | 260—2.5 |
| 3,087,900 | 4/1963 | Brown | 260—2.5 |
| 3,284,404 | 11/1966 | Schollenberger et al. | 260—2.5 |

(Other references on following page)

UNITED STATES PATENTS

| | | | |
|---|---|---|---|
| 3,446,771 | 5/1969 | Matsubayashi et al. | 260—77.5 |
| 3,502,621 | 3/1970 | Wilson | 260—75 |
| 3,137,662 | 6/1964 | Recktenwald | 260—2.5 |

FOREIGN PATENTS

| | | | |
|---|---|---|---|
| 705,937 | 3/1965 | Canada | 260—2.5 |
| 792,016 | 3/1958 | Great Britain | 260—2.5 |
| 1,072,922 | 6/1967 | Great Britain | 260—2.5 |
| 1,481,815 | 4/1967 | France | 260—2.5 |

OTHER REFERENCES

Defensive Publication T 858022 issued to Fogiel; published January 1969, filed April 1968.

DONALD E. CZAJA, Primary Examiner

E. C. RZUCIDLO, Assistant Examiner

U.S. Cl. X.R.

260—2.5 AB, 2.5 AN, 2.5 BD, 75 NK, 75 NB